United States Patent
Fujisawa et al.

(10) Patent No.: US 9,776,862 B2
(45) Date of Patent: Oct. 3, 2017

(54) HYDROGEN PRODUCTION APPARATUS AND HYDROGEN PRODUCTION METHOD

(71) Applicant: Kobe Steel, Ltd., Hyogo (JP)

(72) Inventors: Akitoshi Fujisawa, Kobe (JP); Akira Matsuoka, Kobe (JP); Hiroo Hangai, Kobe (JP); Koji Noishiki, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/052,566

(22) Filed: Feb. 24, 2016

(65) Prior Publication Data
US 2016/0251217 A1 Sep. 1, 2016

(30) Foreign Application Priority Data
Feb. 26, 2015 (JP) .................................. 2015-036902

(51) Int. Cl.
*B01J 7/00* (2006.01)
*C01B 3/48* (2006.01)
(Continued)

(52) U.S. Cl.
CPC ............ *C01B 3/48* (2013.01); *B01D 53/1425* (2013.01); *B01D 53/1475* (2013.01);
(Continued)

(58) Field of Classification Search
CPC ............ B01D 53/1425; B01D 53/1475; C01B 2203/0233; C01B 2203/0283;
(Continued)

(56) References Cited

U.S. PATENT DOCUMENTS

| 4,733,528 A | * | 3/1988 | Pinto | ...................... C01B 3/025 |
| | | | | 252/376 |
| 2010/0129284 A1 | * | 5/2010 | Niitsuma | ............. B01D 53/047 |
| | | | | 423/437.1 |

(Continued)

FOREIGN PATENT DOCUMENTS

| DE | 102009055617 A1 | 5/2011 |
| JP | 2002-255510 A | 9/2002 |

(Continued)

OTHER PUBLICATIONS

The extended European search report issued by the European Patent Office dated Jun. 24, 2016, which corresponds to European Patent Application No. 16153601.6-1354 and is related to U.S. Appl. No. 15/052,566.

*Primary Examiner* — Imran Akram
(74) *Attorney, Agent, or Firm* — Studebaker & Brackett PC

(57) ABSTRACT

Provided is a hydrogen production apparatus enabling reduction of energy needed for separation and collection of $CO_2$ in the hydrogen production. The hydrogen production apparatus includes a reformer, a heating device heating the reformer, a transformer, a hydrogen separation device separating and taking out hydrogen from transformed gas, a $CO_2$ separation device separating and taking out $CO_2$ from off-gas from which hydrogen was separated by the hydrogen separation device, a heat collecting device collecting heat of the reformed gas, heat of the transformed gas, and waste heat from the heating device, and a heat medium supply device supplying the heat medium having absorbed heat collected by the heat collecting device to the $CO_2$ separation device. The absorption liquid having absorbed $CO_2$ in off-gas is heated by the heat medium heated with collected heat, thereby releasing $CO_2$.

10 Claims, 8 Drawing Sheets

(51) Int. Cl.
*B01D 53/14* (2006.01)
*C01B 3/38* (2006.01)
*B01D 53/18* (2006.01)
*B01J 19/24* (2006.01)
*C01B 3/50* (2006.01)

(52) U.S. Cl.
CPC .............. *B01D 53/18* (2013.01); *B01J 19/24* (2013.01); *C01B 3/38* (2013.01); *C01B 3/508* (2013.01); *C01B 2203/0205* (2013.01); *C01B 2203/0233* (2013.01); *C01B 2203/0283* (2013.01); *C01B 2203/043* (2013.01); *C01B 2203/0415* (2013.01); *C01B 2203/0475* (2013.01); *C01B 2203/08* (2013.01); *C01B 2203/1235* (2013.01); *C01B 2203/142* (2013.01); *C01B 2203/86* (2013.01); *Y02C 10/06* (2013.01); *Y02P 20/129* (2015.11); *Y02P 20/152* (2015.11); *Y02P 20/57* (2015.11); *Y02P 30/30* (2015.11)

(58) Field of Classification Search
CPC ...... C01B 2203/043; C01B 2203/0475; C01B 3/48; C01B 2203/0405; C01B 2203/0415; C01B 31/20; C01B 3/508
See application file for complete search history.

(56) References Cited

U.S. PATENT DOCUMENTS

| | | | |
|---|---|---|---|
| 2010/0287981 | A1 | 11/2010 | Chen et al. |
| 2012/0230897 | A1* | 9/2012 | Abanades Garcia .. B01D 53/62 423/230 |
| 2015/0353454 | A1 | 12/2015 | Iijima |
| 2016/0176784 | A1* | 6/2016 | Okada ....................... C01B 3/38 585/264 |

FOREIGN PATENT DOCUMENTS

| | | | | |
|---|---|---|---|---|
| JP | 2007-254229 A | | 10/2007 | |
| JP | WO 2015019608 A1 | * | 2/2015 | .............. C01B 3/38 |
| WO | 2014125986 A1 | | 8/2014 | |

* cited by examiner

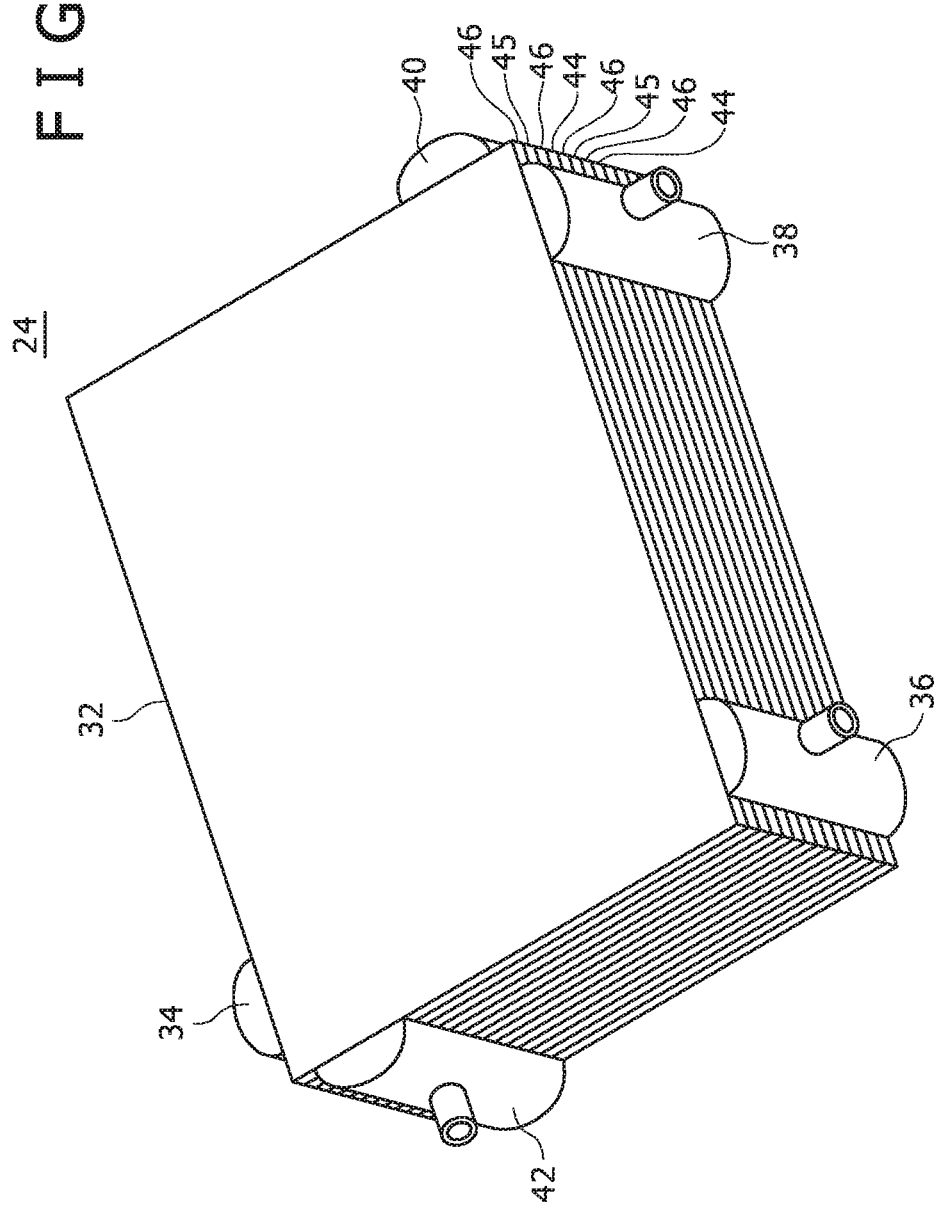

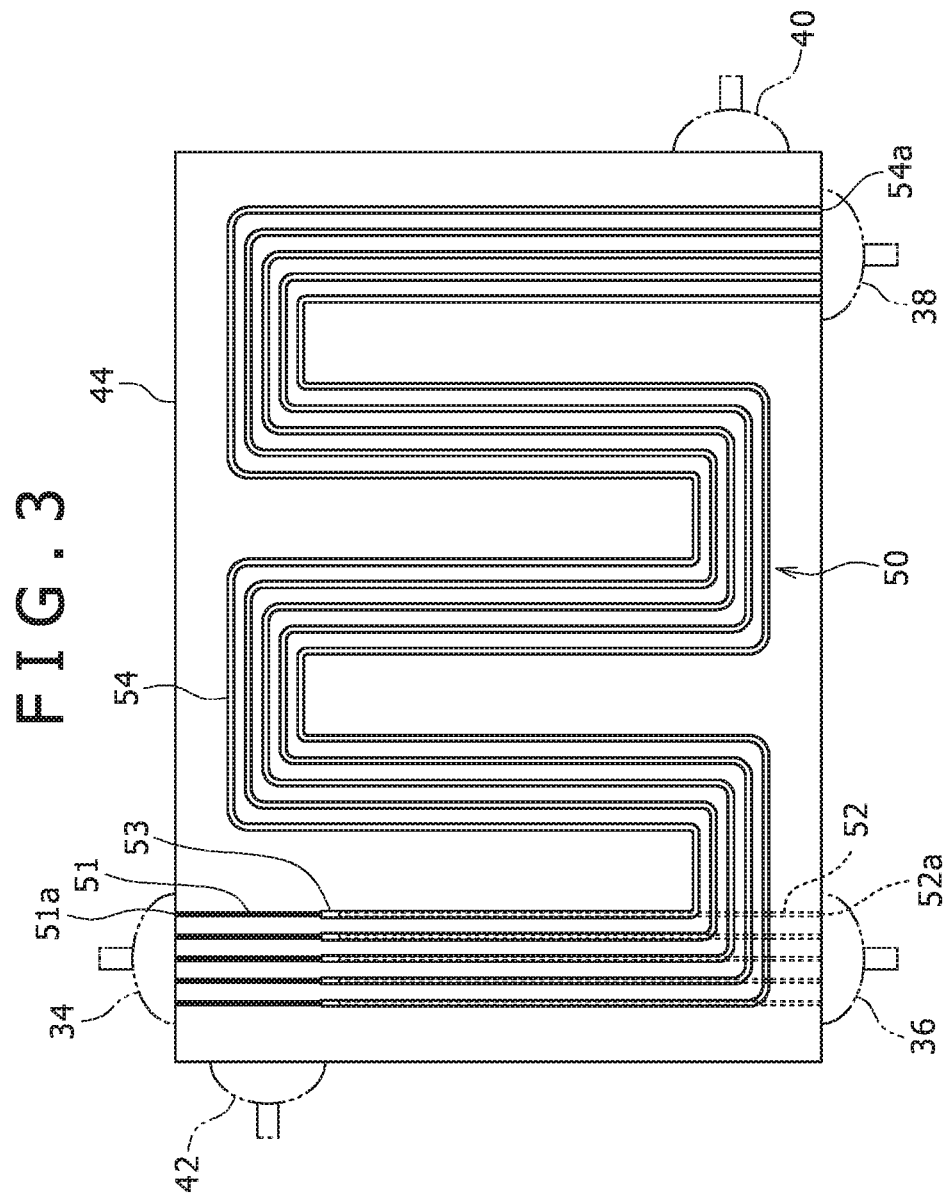

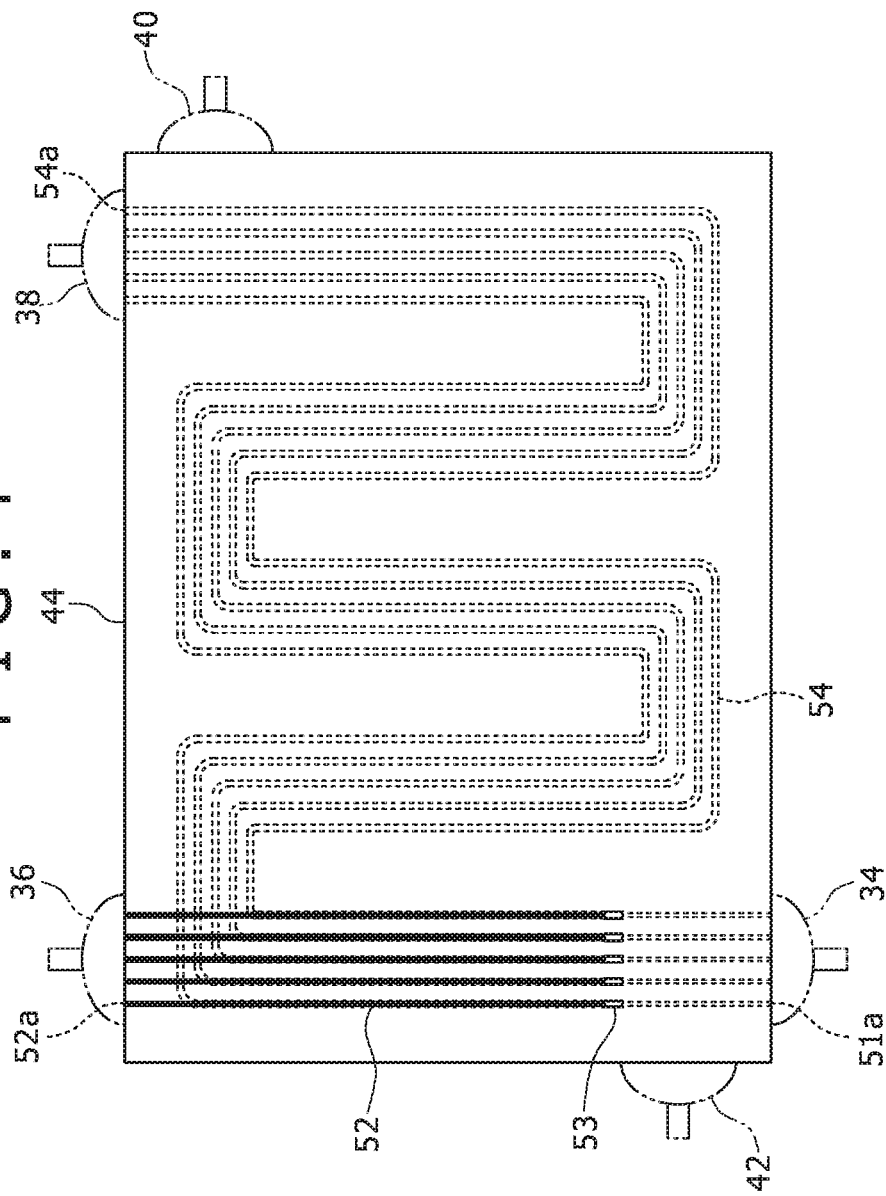

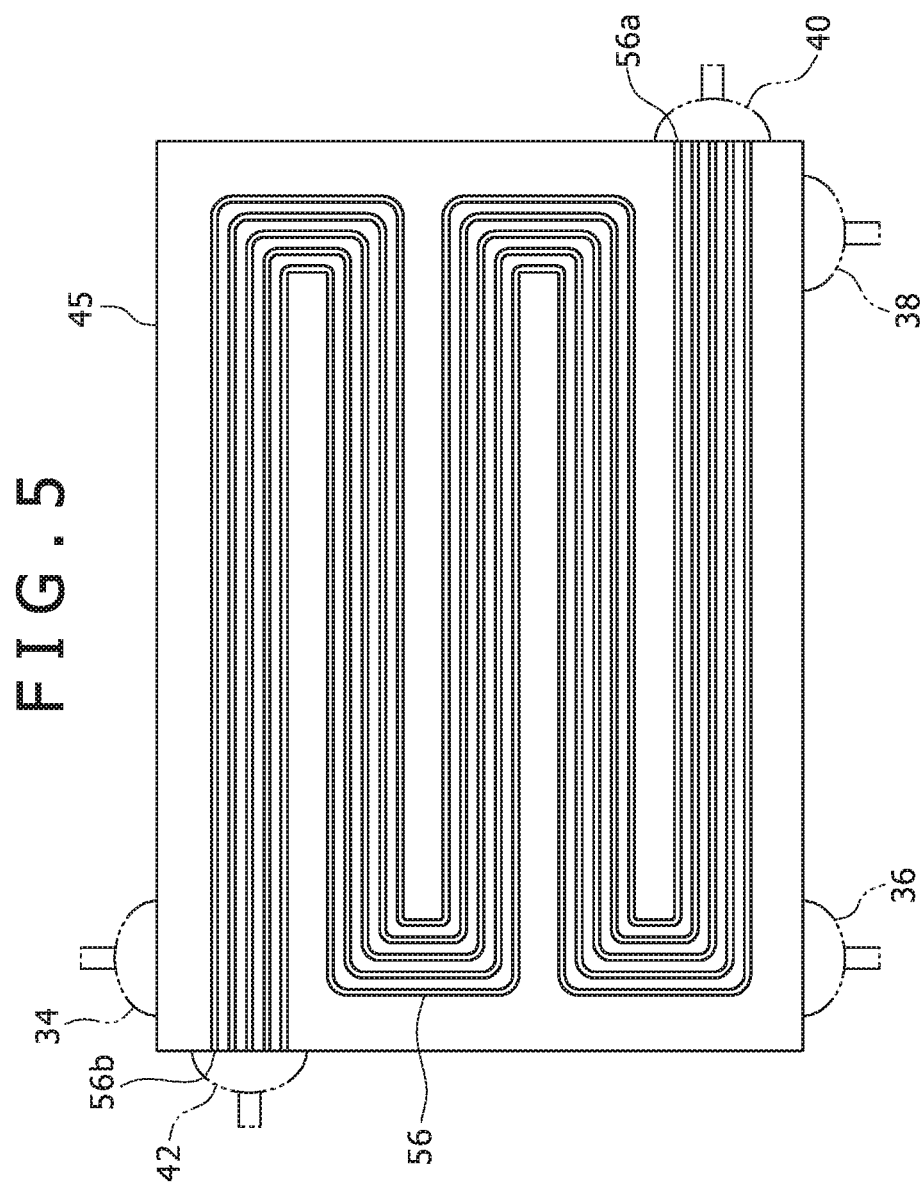

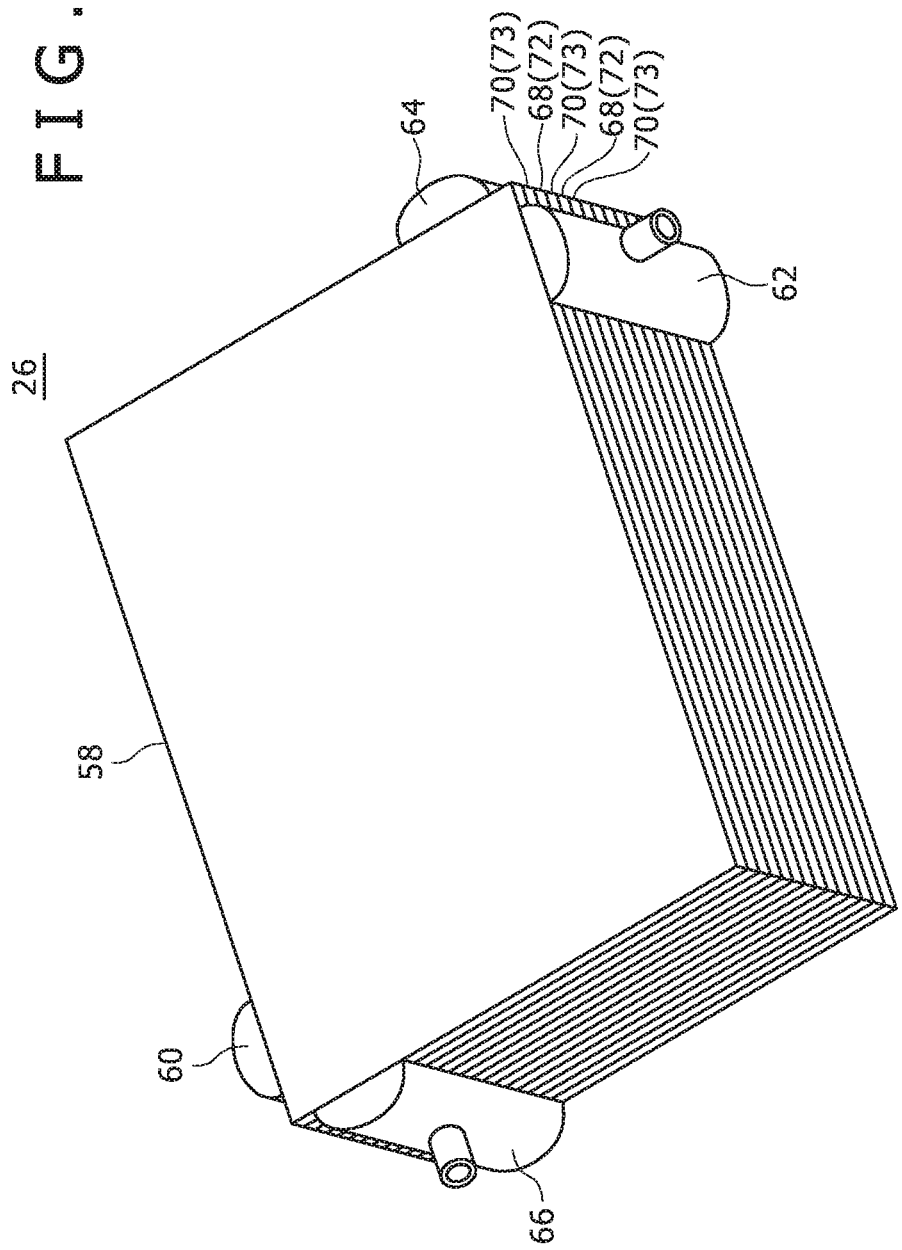

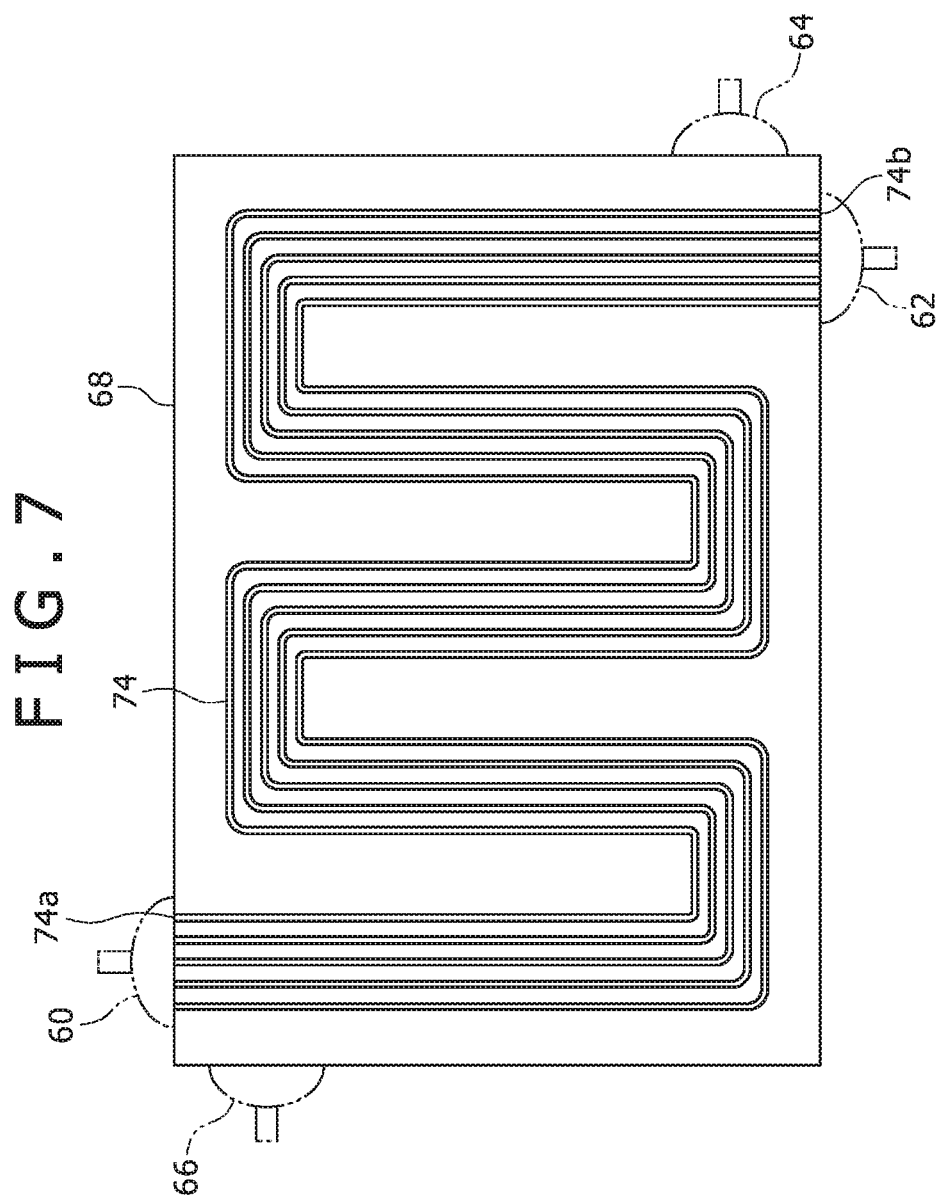

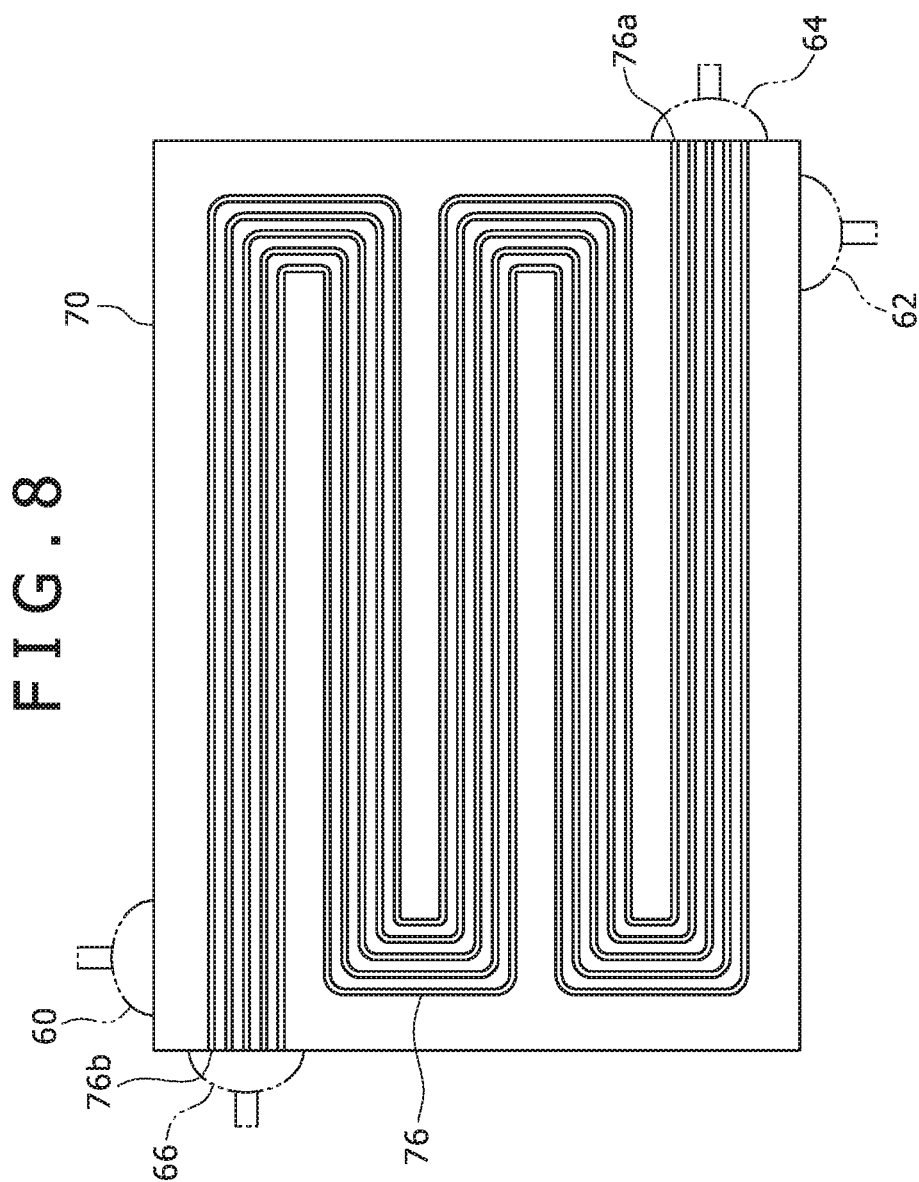

HYDROGEN PRODUCTION APPARATUS AND HYDROGEN PRODUCTION METHOD

BACKGROUND OF THE INVENTION (Field of the Invention)

The present invention relates to a hydrogen production apparatus and a hydrogen production method.

(Description of the Related Art)

Conventionally, a hydrogen production apparatus for producing hydrogen to be supplied to a fuel-cell vehicle or a domestic fuel cell has been proposed. For example, JP2002-255510A discloses an example of such a hydrogen production apparatus.

The hydrogen production apparatus disclosed in JP2002-255510A has the following configuration: raw material gas composed of hydrocarbon gas such as city gas, LP gas, or the like is desulfurized by a desulfurizer, and then, a reforming reaction is caused to occur to the raw material gas and water vapor by a reformer, whereby hydrogen-rich reformed gas is generated; from the reformed gas thus generated, $CO_2$ is removed by a $CO_2$ remover, and then, CO is removed therefrom in a transformation reaction by a CO transformer; thereafter, CO is removed by a pressure swing adsorption (PSA) purification apparatus, whereby high-purity hydrogen is taken out. In JP2002-255510A, the following remover is disclosed as an exemplary preferable $CO_2$ remover for removing $CO_2$ from high-temperature reformed gas: a remover that uses a solid absorbent made of an oxide ceramic that can absorb $CO_2$ at a high temperature in the vicinities of the temperature of the reformed gas so as to cause the solid absorbent to absorb $CO_2$ from the reformed gas, thereby removing $CO_2$ therefrom.

In recent years, with a view to preventing global warming and the like, techniques for not releasing into atmosphere but collecting $CO_2$ removed from reformed gas in hydrogen production process, and storing the same underground or the like, have been studied and developed. In the case of the hydrogen production apparatus disclosed in JP2002-255510A described above, however, it is necessary to apply a large amount of energy in order to collect $CO_2$ absorbed in the absorbent of the $CO_2$ remover.

More specifically, in order to collect $CO_2$ absorbed in an absorbent, commonly, the absorbent is heated so as to be caused to release $CO_2$, and here, it is necessary to heat the absorbent to a temperature higher than the reaction temperature of the absorption reaction when the absorbent absorbed $CO_2$. This requires to apply a large amount of energy. In particular, as is the case with JP2002-255510A, in the case where a solid absorbent that can absorb $CO_2$ at a high temperature is used and is caused to absorb $CO_2$ from a reformed gas at a high temperature, it is necessary to heat the solid absorbent to a very high temperature so as to cause the solid absorbent to release $CO_2$, and consequently, it is necessary to apply a very large amount of energy.

The present invention was made in order to solve the above-described problem, and it is an object of the present invention to provide a hydrogen production apparatus and a hydrogen production method with which it is possible to reduce energy applied for separation and collection of $CO_2$ that is involved in the production of hydrogen.

In order to achieve the above-described object, a hydrogen production apparatus according to the present invention includes: a reformer that causes a reforming reaction to occur between hydrocarbon and water vapor so as to generate CO and hydrogen; a heating device that heats the reformer so as to cause the reforming reaction to proceed; a transformer that causes a transformation reaction of CO in reformed gas generated by the reformer that contains CO and hydrogen, with water vapor, so as to generate hydrogen and $CO_2$; a hydrogen separation device that separates and takes out hydrogen from transformed gas generated by the transformation reaction that contains hydrogen and $CO_2$; a $CO_2$ separation device that separates and takes out $CO_2$ from off-gas that is gas remaining after hydrogen is separated from the transformed gas by the hydrogen separation device; a heat collecting device that collects at least one among heat of the reformed gas, heat of the transformed gas, and waste heat from the heating device; and a heat supply device that supplies heat collected by the heat collecting device to the $CO_2$ separation device, wherein the $CO_2$ separation device includes: a capturing unit that captures $CO_2$ in the off-gas with use of a capturing agent that absorbs or adsorbs $CO_2$; and a heating unit that heats a capturing agent after capture that is the capturing agent after capturing $CO_2$, by utilizing heat supplied from the heat supply device, in order to cause the capturing agent after capture to release $CO_2$, thereby taking out $CO_2$ therefrom.

In this hydrogen production apparatus, the heat collecting device collects at least one among heat of reformed gas, heat of transformed gas, and waste heat from the heating device heating the reformer; the heat supply device supplies heat collected by the heat collecting device to the $CO_2$ separation device; the capturing unit of the $CO_2$ separation device captures $CO_2$ in off-gas after hydrogen separation with the capturing agent; and the heating unit of the $CO_2$ separation device heats the capturing agent after capture by utilizing heat supplied from the heat supply device, in order to cause the capturing agent after capture, which has captured $CO_2$, to release $CO_2$, whereby taking out $CO_2$. Thus, by utilizing at least one among heat of the reformed gas, heat of the transformed gas, and waste heat from the heating device, $CO_2$ can be caused to be released from the capturing agent after capture. This makes it possible to save energy to be additionally applied for causing the capturing agent after capture to release $CO_2$ so that $CO_2$ is taken out. In this hydrogen production apparatus, therefore, energy applied for separation and collection of $CO_2$, which is involved in the hydrogen production, can be reduced.

In the hydrogen production apparatus, the heat collecting device preferably includes a waste heat collection unit that collects waste heat from the heating device.

Waste heat from the heating device for heating the reformer is usually disposed of, but with this configuration, the waste heat to be disposed of can be collected, and the collected waste heat can be supplied by the heat supply device to the $CO_2$ separation device so as to be effectively utilized for heating the capturing agent after capture by the heating unit. This makes it possible to further reduce energy costs.

In the hydrogen production apparatus, preferably, the heat collecting device includes a heat storage unit that stores collected heat, and the heat supply device supplies the heat stored in the heat storage unit to the heating unit.

With this configuration, for example, even if the amount of hydrogen production sharply increases, which results in that throughput per unit time for causing the capturing agent after capture to release $CO_2$ in the $CO_2$ separation device sharply increases, leading to a sharp increase in the amount of heat needed for heating the capturing agent after capture in the heating unit, it is possible to cope with the sharp increase in the amount of needed heat, with the heat stored in the heat storage unit.

In the hydrogen production apparatus, preferably, the heat collecting device includes a heat absorption processing unit that causes heat medium to absorb at least one among the heat of the reformed gas, the heat of the transformed gas, and the waste heat from the heating device, the heat supply device includes a heat medium supply device that supplies the heat medium having absorbed heat to the heating unit, and the heating unit heats the capturing agent after capture by imparting, to the capturing agent after capture, heat of the heat medium supplied from the heat medium supply device.

In this configuration, as heat is supplied to the heating unit by supplying the heat medium having absorbed at least one among the heat of the reformed gas, the heat of the transformed gas, and the waste heat from the heating device to the heating unit, the amount of heat lost in the process of heat supply to the heating unit can be reduced, as compared with, for example, the case where at least one among the heat of the reformed gas, the heat of the transformed gas, and the waste heat from the heating device is supplied to the heating unit by heat conduction. In other words, in the case where heat is supplied via a heat transfer member by heat conduction to a heating unit, relatively much heat is lost from the heat transfer member in the process of heat conduction, whereas the amount of lost heat can be controlled by supplying the heat medium itself having absorbed heat to the heating unit, as is the case of the present configuration.

In this case, preferably, the capturing agent is absorption liquid that is capable of absorbing $CO_2$ from the off-gas, the capturing unit is an absorption processing unit that causes the absorption liquid to absorb $CO_2$ in the off-gas, the $CO_2$ separation device includes a releasing unit provided with a release flow passage that, while allowing absorption liquid after absorption that is the absorption liquid having absorbed $CO_2$ in the absorption processing unit to flow therethrough, causes the absorption liquid after absorption to release $CO_2$, the heating unit includes a heat medium flow passage that allows the heat medium supplied from the heat medium supply device to flow therethrough in such a manner that the heat medium exchanges heat with the absorption liquid after absorption flowing through the release flow passage, and both of the release flow passage and the heat medium flow passage are microchannels.

With this configuration, the amount of heat exchange per unit flow amount between the absorption liquid after absorption and the heat medium can be increased by heat exchange between the absorption liquid after absorption flowing through the release flow passage, which is a microchannel, and the heat medium flowing through the heat medium flow passage, which is a microchannel. This makes it possible to increase the amount of heat per unit flow amount imparted from the heat medium to the absorption liquid after absorption. Consequently, in the releasing unit, the amount of $CO_2$ per unit flow amount released by the absorption liquid after absorption can be increased, whereby the efficiency of release of $CO_2$ from the absorption liquid after absorption in the releasing unit can be improved.

In the hydrogen production apparatus, preferably, the heating device includes a burner that burns off-gas from which $CO_2$ is removed by the capturing agent capturing $CO_2$, so as to generate heat for heating the reformer.

With this configuration, fuel to be consumed for heating the reformer can be saved.

Further, a hydrogen production method according to the present invention includes: a reforming step of, while heating hydrocarbon and water vapor, causing a reforming reaction to occur between the hydrocarbon and the water vapor so as to generate CO and hydrogen; a transforming step of causing a transformation reaction of CO in the in reformed gas generated in the reforming step that contains CO and hydrogen, with water vapor, so as to generate hydrogen and $CO_2$; a hydrogen separation step of separating and taking out hydrogen from transformed gas generated in the transformation step that contains hydrogen and $CO_2$; a heat collecting step of collecting at least one among heat of the reformed gas, heat of the transformed gas, and waste heat of the heat used for heating hydrocarbon and water vapor in the reforming step; and a $CO_2$ separating step of separating and taking out $CO_2$ from off-gas that is gas remaining after hydrogen is separated from the transformed gas by the hydrogen separation step, wherein the $CO_2$ separating step includes: a capturing step of capturing $CO_2$ in the off-gas with use of a capturing agent that absorbs or adsorbs $CO_2$; and a releasing step of causing a capturing agent after capture that is the capturing agent after capturing $CO_2$ to release $CO_2$ thereby taking out $CO_2$ therefrom, wherein the releasing step includes a heating step of heating the capturing agent after capture by utilizing heat collected in the heat collecting step in order to cause the capturing agent after capture to release $CO_2$.

In this hydrogen production method, at least one among heat of reformed gas, heat of transformed gas, and, waste heat of the heat used for heating hydrocarbon and water vapor in the reforming step is collected, and the capturing agent after capture is heated by utilizing the collected heat, so as to cause $CO_2$ to be released from the capturing agent after capture in the heating step in the release step. This makes it possible to save energy to be additionally applied for causing the capturing agent after capture to release $CO_2$ so that $CO_2$ is taken out. In this hydrogen production apparatus, therefore, energy applied for separation and collection of $CO_2$, which is involved in the hydrogen production, can be reduced.

In the hydrogen production method, preferably, in the heat collecting step, waste heat of heat used for heating hydrocarbon and water vapor in the reforming step is collected.

With this configuration, the waste heat that is disposed of usually can be collected, and the collected waste heat can be effectively utilized for heating the capturing agent after capture in the heating step. This makes it possible to further reduce energy costs.

In the hydrogen production method, preferably, the heat collecting step includes a heat storing step of storing collected heat in a heat storage unit, and in the heating step, the capturing agent after capture is heated by utilizing heat stored in the heat storage unit in the heat storing step.

With this configuration, for example, even if the amount of hydrogen production sharply increases, which results in that throughput per unit time for causing the capturing agent after capture to release $CO_2$ in the releasing step in the $CO_2$ separating step sharply increases, leading to a sharp increase in the amount of heat needed for heating the capturing agent after capture, it is possible to cope with the sharp increase in the amount of needed heat, with the heat stored in the heat storage unit.

In the hydrogen production method, preferably, the heat collecting step includes a heat absorbing step of causing heat medium to absorb at least one among the heat of the reformed gas, the heat of the transformed gas, and the waste heat, the hydrogen production method further comprising: a heat medium supplying step of supplying the heat medium having absorbed heat in the heat absorbing step to a heating unit for heating the capturing agent after capture in the heating step, wherein in the heating step, heat of the heat medium supplied to the heating unit in the heat medium supplying step is imparted to the capturing agent after capture, whereby the capturing agent after capture is heated.

In this configuration, as heat is supplied to the heating unit by supplying the heat medium having absorbed at least one among the heat of the reformed gas, the heat of the transformed gas, and the waste heat from the heating device, to the heating unit, the amount of heat lost in the process of heat supply to the heating unit can be reduced, as compared with, for example, the case where at least one among the heat of the reformed gas, the heat of the transformed gas, and the waste heat from the heating device is supplied to the heating unit by heat conduction by the heat supply device.

In this case, preferably, the capturing step includes a $CO_2$ absorbing step of absorbing $CO_2$ in the off-gas by using, as the capturing agent, absorption liquid that is capable of absorbing $CO_2$ from the off-gas, in the releasing step, while absorption liquid after absorption that is absorption liquid having absorbed $CO_2$ in the $CO_2$ absorbing step is caused to flow through a release flow passage that is a microchannel, the absorption liquid after absorption is caused to release $CO_2$, and in the heating step, while the heat medium having absorbed heat in the heat absorption step is caused to flow through a heat medium flow passage that is a microchannel, the heat medium is caused to exchange heat with absorption liquid after absorption flowing through the release flow passage, whereby the absorption liquid after absorption is heated.

With this configuration, the amount of heat exchange per unit flow amount between the absorption liquid after absorption and the heat medium can be increased by heat exchange between the absorption liquid after absorption flowing through the release flow passage, which is a microchannel, and the heat medium flowing through the heat medium flow passage, which is a microchannel. This makes it possible to increase the amount of heat per unit flow amount imparted from the heat medium to the absorption liquid after absorption. Consequently, in the releasing step, the amount of $CO_2$ per unit flow amount released by the absorption liquid after absorption can be increased, whereby the efficiency of release of $CO_2$ from the absorption liquid after absorption in the releasing step can be improved.

In the hydrogen production method, preferably, the reforming step includes a heat generating step of burning off-gas from which $CO_2$ is removed by the capturing agent capturing $CO_2$ in the capturing step, so as to generate heat for heating hydrocarbon and water vapor.

With this configuration, fuel to be consumed for heating hydrocarbon and water vapor in the reforming step can be saved.

As described above, with the hydrogen production apparatus and the hydrogen production method of the present invention, energy applied for separation and collection of $CO_2$, which is involved in the hydrogen production, can be reduced.

BRIEF DESCRIPTION OF THE DRAWINGS

FIG. 2 is a schematic perspective view illustrating an absorption processing unit of a $CO_2$ separation device of the hydrogen production apparatus illustrated in FIG. 1.

FIG. 3 is a plan view illustrating one of plate surfaces of an absorption flow passage substrate that composes a first flow passage structure of the absorption processing unit illustrated in FIG. 2.

FIG. 4 is a plan view illustrating an opposite-side plate surface of the absorption flow passage substrate illustrated in FIG. 3.

FIG. 5 is a plan view illustrating a cooling substrate that composes the first flow passage structure of the absorption processing unit illustrated in FIG. 2.

FIG. 6 is a schematic perspective view illustrating a release processing unit of the $CO_2$ separation device of the hydrogen production apparatus illustrated in FIG. 1.

FIG. 7 is a plan view illustrating a release flow passage substrate composing a second flow passage structure of the release processing unit illustrated in FIG. 6.

FIG. 8 is a plan view illustrating a heat medium substrate composing the second flow passage structure of the release processing unit illustrated in FIG. 6.

DESCRIPTION OF THE PREFERRED EMBODIMENTS

Figure 1:
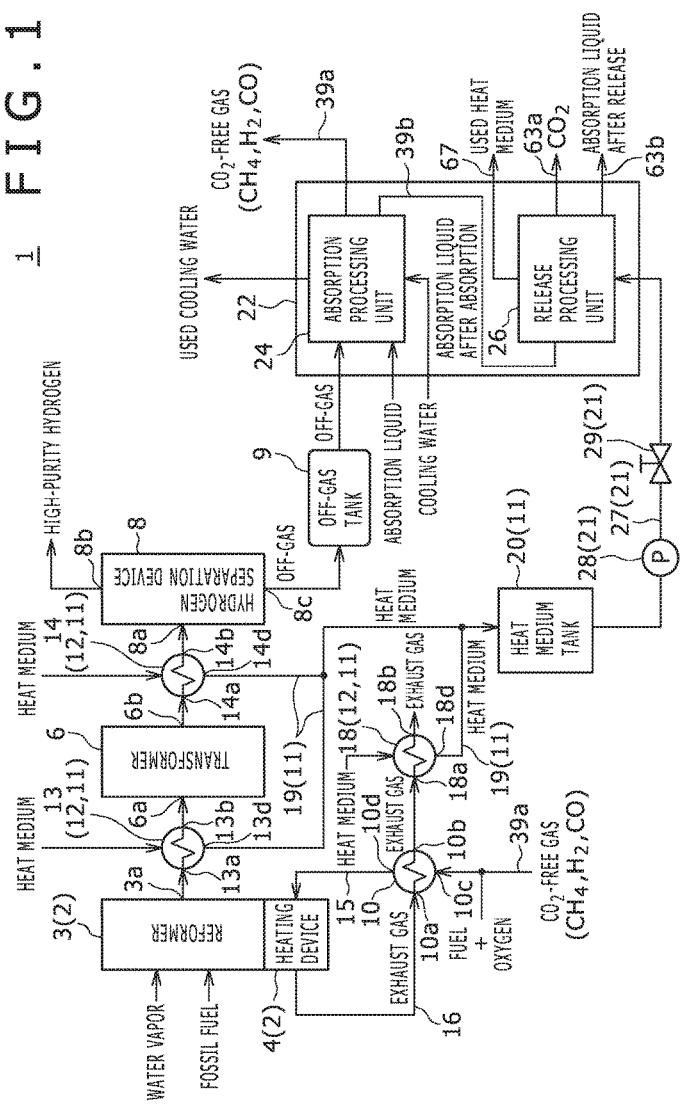
FIG. 1 is a schematic diagram illustrating a hydrogen production apparatus according to one embodiment of the present invention.

Hereinafter, an embodiment of the present invention is described with reference to the drawings.

FIG. 1 illustrates a hydrogen production apparatus 1 according to an embodiment of the present invention. The hydrogen production apparatus 1 is a device for producing hydrogen from fossil fuel such as compressed natural gas (CNG).

The hydrogen production apparatus 1 includes a reforming device 2, a transformer 6, a hydrogen separation device 8, an off-gas tank 9, an exhaust gas heat exchanger 10, a heat collecting device 11, a heat medium supply device 21, and a $CO_2$ separation device 22, as illustrated in FIG. 1.

The reforming device 2 reforms fossil fuel such as CNG so as to generate hydrogen-rich reformed gas. The reforming device 2 includes a reformer 3 and a heating device 4.

To the reformer 3, fossil fuel and water vapor are introduced. The reformer 3 causes a reforming reaction to occur between methane ($CH_4$) in the introduced fossil fuel and the water vapor so that carbon monoxide (CO) and hydrogen are generated. This reforming reaction is an endothermic reaction. The reformer 3 includes a discharge part 3a that discharges reformed gas in which CO and hydrogen that are generated as well as $CH_4$ and water vapor that did not react.

The heating device 4 heats the reformer 3 in order to cause the reforming reaction to proceed. To the heating device 4, mixed gas is supplied that contains fuel and oxygen, as well as $CO_2$-free gas discharged from an absorption processing unit 24 to be described below of the $CO_2$ separation device 22. The heating device 4 is, more specifically, a burner that burns the mixed gas supplied thereto so as to generate heat for heating the reformer 3.

The transformer 6 causes a transformation reaction of CO in the reformed gas generated by the reformer 3 that contains CO and hydrogen, with water vapor, so as to generate hydrogen and $CO_2$. More specifically, this transformer 6 has an introduction part 6a that is continuous to the discharge part 3a of the reformer 3 and receives the reformed gas discharged from the discharge part 3a. The transformer 6 causes a transformation reaction between CO in the reformed gas introduced through introduction part 6a and water vapor. The transformer 6 has a discharge part 6b that discharges transformed gas that contains hydrogen and $CO_2$ generated by the transformation reaction, CO and water vapor that did not react, and a very small amount of $CH_4$.

The hydrogen separation device 8 separates and takes out high-purity hydrogen from the transformed gas containing hydrogen and $CO_2$ that were generated by the transformation reaction in the transformer 6. The hydrogen separation device 8 includes: an introduction part 8a that is continuous to the discharge part 6b of the transformer 6 and receives the transformed gas discharged from the discharge part 6b; a hydrogen discharge part 8b that discharges high-purity hydrogen separated; and an off-gas discharge part 8c that discharges off-gas, which is gas that remains after separating hydrogen from the transformed gas. The hydrogen separation device 8 separates high-purity hydrogen from the transformed gas introduced thereto, by a known pressure swing adsorption (PSA) method. The hydrogen discharge part 8b is connected via a pipe to a fuel cell or the like, which is on the hydrogen demand side, so that high-purity hydrogen discharged from this hydrogen discharge part 8b is supplied via the pipe to the fuel cell or the like. Off-gas discharged from the off-gas discharge part 8c contains CO, $CO_2$, hydrogen that was not separated, and a very small amount of $CH_4$.

The off-gas tank 9 is connected via a pipe to the off-gas discharge part 8c of the hydrogen separation device 8. To the off-gas tank 9, off-gas discharged from the off-gas discharge part 8c is introduced. The off-gas tank 9 retains the off-gas thus introduced thereto.

The exhaust gas heat exchanger 10 is provided in a supply path 15 and an exhaust path 16 that are continuous to the heating device 4. The supply path 15 is a flow passage that supplies the mixed gas to the heating device 4. The exhaust path 16 is a flow passage from which exhaust gas that is generated when the heating device 4 burns the mixed gas is discharged from the heating device 4. The exhaust gas heat exchanger 10 has an exhaust gas introduction port 10a, an exhaust gas discharge port 10b, a mixed gas introduction port 10c, and a mixed gas discharge port 10d. The exhaust gas heat exchanger 10 causes heat exchange between the following exhaust gas and mixed gas: exhaust gas having a high temperature that is discharged from the heating device 4 to the exhaust path 16 and is introduced via the exhaust gas introduction port 10a to the inside of the exhaust gas heat exchanger 10; and the mixed gas that is introduced via the mixed gas introduction port 10c to the inside of the exhaust gas heat exchanger 10. Thereby, the temperature of the mixed gas is raised. From the exhaust gas discharge port 10b, the exhaust gas after being subjected to the heat exchange is discharged. From the mixed gas discharge port 10d, the mixed gas after being subjected to the heat exchange thereby having the temperature raised, is discharged, passes through the supply path 15, and is supplied to the heating device 4.

The heat collecting device 11 collects heat that the reformed gas discharged from the reformer 3 has, heat that transformed gas discharged from the transformer 6 has, and a part of waste heat from the heating device 4. This heat collecting device 11 includes a heat absorption processing unit 12, a heat medium collection path 19, and a heat medium tank 20.

The heat absorption processing unit 12 performs a processing operation that causes the heat of the reformed gas, the heat of the transformed gas, and a part of the waste heat from the heating device 4 to be absorbed by a heat medium. The heat absorption processing unit 12 includes a first heat exchanger 13, a second heat exchanger 14, and a third heat exchanger 18.

The first heat exchanger 13 is provided in a supply path for supplying the reformed gas from the reformer 3 to the transformer 6. The first heat exchanger 13 causes heat exchange to occur between high-temperature reformed gas and a heat medium having a temperature lower than that of the reformed gas, thereby causing the temperature of the reformed gas to fall to the vicinity of reaction temperature of the transformation reaction performed in the transformer 6, and causing the heat of the high-temperature reformed gas to be absorbed by the heat medium.

The first heat exchanger 13 has an introduction port 13a that is continuous to the discharge part 3a of the reformer 3, and a discharge port 13b that leads to the introduction part 6a of the transformer 6. Further, the configuration is such that the heat medium is introduced to the first heat exchanger 13. The first heat exchanger 13 subjects the reformed gas introduced thereto via the introduction port 13a to heat exchange with the heat medium, and thereafter, discharges the same via the discharge port 13b. The first heat exchanger 13 has a heat medium discharge port 13d, and discharges the heat medium after being subjected to the heat exchange through the heat medium discharge port 13d.

The second heat exchanger 14 is provided in a supply path for supplying the transformed gas from the transformer 6 to the hydrogen separation device 8. The second heat exchanger 14 causes heat exchange to occur between the transformed gas and a heat medium having a temperature lower than the temperature of the transformed gas, thereby causing the temperature of the transformed gas to fall to the vicinity of a temperature suitable for separation of hydrogen performed in the hydrogen separation device 8, and causing heat of the transformed gas to be absorbed by the heat medium.

The second heat exchanger 14 has an introduction port 14a that leads to the discharge part 6b of the transformer 6, and a discharge port 14b that leads to the introduction part 8a of the hydrogen separation device 8. Further, the configuration is such that the heat medium is introduced to the second heat exchanger 14. The second heat exchanger 14 subjects the transformed gas introduced thereto via the introduction port 14a to heat exchange with the heat medium, and thereafter, discharges the same via the discharge port 14b. The second heat exchanger 14 has a heat medium discharge port 14d, and discharges the heat medium after being subjected to the heat exchange through the heat medium discharge port 14d.

The third heat exchanger 18 is provided in the exhaust path 16, on the downstream side with respect to the exhaust gas heat exchanger 10. The third heat exchanger 18 causes heat exchange to occur between the exhaust gas after being subjected to heat exchange in the exhaust gas heat exchanger 10 and a heat medium having a temperature lower than the temperature of the exhaust gas, so that heat of the exhaust gas is absorbed by the heat medium. In other words, the third heat exchanger 18 causes a part of the waste heat, which is remaining heat after the other was used by the reformer 3 for the reforming reaction among the heat generated by the heating device 4, to be absorbed by the heat medium, so as to collect the heat. The third heat exchanger 18 is an exemplary waste heat collection unit according to the present invention.

The third heat exchanger 18 has an introduction port 18a that leads to the exhaust gas discharge port 10b of the exhaust gas heat exchanger 10 and receives exhaust gas discharged from the exhaust gas discharge port 10b, and a discharge port 18b that allows exhaust gas that has been subjected to heat exchange in the third heat exchanger 18 to be discharged. Further, the third heat exchanger 18 is configured such that a heat medium having a temperature lower than the temperature of the exhaust gas introduced to the third heat exchanger 18 is introduced thereto. The third heat exchanger 18 subjects the exhaust gas introduced into the third heat exchanger 18 via the introduction port 18a to heat exchange with the heat medium, and thereafter discharges the same via the discharge port 18b. The third heat exchanger 18 has a heat medium discharge port 18d, and discharges the heat medium having used for the heat exchange, from the heat medium discharge port 18d.

The heat medium collection path 19 mutually connects the heat medium discharge ports 13d, 14d, and 18d of the first to third heat exchangers 13, 14, and 18 with the heat medium tank 20. The heat medium collection path 19 guides, to heat medium tank 20, the heat medium discharged from the heat medium discharge ports 13d, 14d, and 18d after being subjected to heat exchange.

The heat medium tank 20 retains the heat medium having been subjected to heat exchange in the first heat exchanger 13, the second heat exchanger 14, and the third heat exchanger 18. In other words, the heat medium tank 20 retains the heat medium having absorbed heat due to heat exchange in each of the heat exchangers 13, 14, and 18, thereby storing the collected heat. This heat medium tank 20 is an exemplary heat storage unit according to the present invention.

The heat medium tank 20 is connected to the heat medium discharge port 13d of the first heat exchanger 13, the heat medium discharge port 14d of the second heat exchanger 14, and the heat medium discharge port 18d of the third heat exchanger 18, via pipes. To the heat medium tank 20, the heat medium discharged from each of the heat medium discharge ports 13d, 14d, and 18d, after the heat exchange, is introduced via the pipes. In the heat medium tank 20, the introduced heat medium is retained.

The heat medium supply device 21 supplies the heat medium having absorbed heat, retained in the heat medium tank 20, to a heating unit 73 (see FIG. 6) of a release processing unit 26 to be described below of the $CO_2$ separation device 22, thereby supplying the heat collected by the heat collecting device 11 to the heating unit 73. This heat medium supply device 21 is an exemplary heat supply device according to the present invention. More specifically, the heat medium supply device 21 includes a heat medium supply pipe 27, a pump 28, and a flow amount control valve 29, as illustrated in FIG. 1.

The heat medium supply pipe 27 connects the heat medium tank 20 and a heat medium supply header 64 (see FIG. 6) to be described below of the release processing unit 26. As the internal space of the heat medium supply header 64 is continuous to a heat medium flow passage 76 (see FIG. 8) of the heating unit 73 as will be described later, the heat medium tank 20 and the heating unit 73 are mutually connected by the heat medium supply pipe 27 and the heat medium supply header 64. The heat medium supply pipe 27 guides the heat medium retained in the heat medium tank 20 to the heat medium supply header 64, and at the same time, guides the heat medium to the heat medium flow passage 76 of the heating unit 73 via the heat medium supply header 64.

The pump 28 is provided in the heat medium supply pipe 27. The pump 28 sends out the heat medium retained in the heat medium tank 20 through the heat medium supply pipe 27 to the heat medium supply header 64. This pump 28 sends out the heat medium, thereby causing the heat medium to be supplied from the heat medium supply pipe 27 via the heat medium supply header 64 to the heating unit 73.

The flow amount control valve 29 is provided in the heat medium supply pipe 27. The flow amount control valve 29 is arranged on the discharge side of the pump 28 in the heat medium supply pipe 27. The flow amount control valve 29 controls the flow amount of the heat medium sent to the heat medium supply header 64; in other words, the flow amount of the heat medium sent to the heating unit 73. The control of the flow amount of the heat medium by the flow amount control valve 29 makes it possible to control the flow amount of the heat medium flowing through the heat medium flow passage 76 of the heating unit 73, which makes it possible to control the amount of heat imparted to absorption liquid after absorption (to be described below) flowing through release flow passages 74.

The $CO_2$ separation device 22 separates and takes out $CO_2$ from the off-gas obtained after high-purity hydrogen is separated by the hydrogen separation device 8. This $CO_2$ separation device 22 is configured so that after $CO_2$ in the off-gas is absorbed into the absorption liquid, the absorption liquid is heated by utilizing heat of the heat medium supplied from the heat medium supply device 21, so that $CO_2$ is released and taken out from the absorption liquid. The absorption liquid is capable of selectively absorbing $CO_2$, and is an exemplary capturing agent according to the present invention. Further, the absorption of $CO_2$ in the off-gas by the absorption liquid is exemplary capturing of $CO_2$ in the off-gas by the capturing agent according to the present invention.

The $CO_2$ separation device 22 includes the absorption processing unit 24 and the release processing unit 26, as illustrated in FIG. 1.

The absorption processing unit 24 performs an absorption processing for causing the absorption liquid to absorb $CO_2$ in the off-gas, wherein, while the off-gas and the absorption liquid are allowed to flow through absorption flow passages 50 (see FIG. 3), which are microchannels, $CO_2$ in the off-gas is absorbed in the absorption liquid. This absorption processing unit 24 is an exemplary capturing unit according to the present invention. As illustrated in FIG. 2, the absorption processing unit 24 includes a first flow passage structure 32, a gas supply header 34, an absorption liquid supply header 36, a separation header 38, a cooling water supply header 40, and a cooling water discharge header 42.

The first flow passage structure 32 includes, in the inside of itself a multiplicity of absorption flow passages 50 (see FIG. 3) that, while allowing the off-gas and the absorption liquid to flow therethrough, allows $CO_2$ to be absorbed from the off-gas into the absorption liquid; and a multiplicity of cooling flow passages 56 (see FIG. 5) through which cooling water for removing reaction heat generated in the $CO_2$ absorption reaction in the absorption flow passages 50 is flown. The absorption flow passages 50 and the cooling flow passages 56 are microchannels each of which has a very small flow passage diameter of several micrometers to several millimeters.

The first flow passage structure 32 is made of a stacked body formed with a multiplicity of plates that are stacked and are bonded on one another, as illustrated in FIG. 2. In the plates composing the first flow passage structure 32, a plurality of absorption flow passage substrates 44, a plurality of cooling substrates 45, and a plurality of sealing plates 46 are included. In the first flow passage structure 32, the absorption flow passage substrates 44 and the cooling substrates 45 are alternately and repeatedly stacked, with the sealing plates 46 being interposed therebetween.

On each of the absorption flow passage substrates 44, as illustrated in FIG. 3, the plurality of absorption flow passages 50 are formed in parallel with one another. As illustrated in FIGS. 3 and 4, each absorption flow passage 50 includes a first supply flow passage part 51, a second supply flow passage part 52, a confluence portion 53, and a processing flow passage part 54.

The first supply flow passage parts 51 are flow passages that guide the off-gas to the confluence portions 53. The second supply flow passage parts 52 are flow passages that guide the absorption liquid to the confluence portions 53. The confluence portions 53 are portions for allowing the off-gas guided by the first supply flow passage parts 51 and the absorption liquid guided by the second supply flow passage parts 52 to join each other. The processing flow passage parts 54 are flow passages that are continuous to the confluence portions 53, and, while allowing the off-gas flowing therein from the confluence portions 53 and the absorption liquid to flow in a state of being in contact with each other, allows the absorption liquid to absorb $CO_2$ from the off-gas. The processing flow passage parts 54 have a meandering shape as illustrated in FIG. 3.

On one of plate surfaces of each absorption flow passage substrate 44, there are formed a plurality of fine grooves that are in shapes respectively corresponding to the first supply flow passage parts 51, and a plurality of fine grooves that are in shapes respectively corresponding to the processing flow passage parts 54. Openings of these grooves on the above-mentioned plate surface are sealed by a sealing plate 46 (see FIG. 2) stacked on the above-mentioned plate surface, whereby each of the first supply flow passage parts 51 and each of the processing flow passage parts 54 are formed.

Further, on a plate surface on a side opposite to the above-mentioned plate surface of each absorption flow passage substrate 44, there are formed a plurality of fine grooves that are in shapes respectively corresponding to the second supply flow passage parts 52. Openings of these grooves on the opposite-side plate surface are sealed by a sealing plate 46 (see FIG. 2) stacked on the opposite-side plate surface, whereby each of the second supply flow passage parts 52 is formed.

Further, in each absorption flow passage substrate 44, a plurality of through holes in shapes respectively corresponding to the confluence portions 53 are formed so as to pass through the absorption flow passage substrate 44 in the thickness direction from the above-mentioned one of plate surfaces to the other opposite-side plate surface of the substrate 44, and each through hole forms each confluence portion 53.

Each first supply flow passage part 51 has a first introduction port 51*a* for receiving the off-gas at an upstream-side end thereof, and each second supply flow passage part 52 has a second introduction port 52*a* for receiving the absorption liquid at an upstream-side end thereof. Further, each processing flow passage part 54 has, at a downstream-side end thereof, an outflow port 54*a* through which the off-gas and the absorption liquid after the absorption processing are allowed to flow out. Each first introduction port 51*a*, each second introduction port 52*a*, and each outflow port 54*a* open on respective corresponding side surfaces of the first flow passage structure 32. The off-gas after absorption flowing out of each outflow port 54*a* is $CO_2$-free gas from which $CO_2$ is removed, and is composed of $CH_4$, hydrogen, and CO. Further, the absorption liquid after absorption flowing out of the outflow ports 54*a* is absorption liquid containing $CO_2$. Hereinafter, this absorption liquid is referred to as the "absorption liquid after absorption". The absorption liquid after absorption is an exemplary capturing agent after capture according to the present invention.

On each cooling substrate 45, as illustrated in FIG. 5, a plurality of cooling flow passages 56 are formed so as to be arranged in parallel. Each cooling flow passage 56 has a meandering shape. On one of plate surfaces of each cooling substrate 45, a plurality of fine grooves are formed, which are in shapes respectively corresponding to the cooling flow passages 56. Openings of these grooves on the above-mentioned plate surface are sealed by a sealing plate 46 (see FIG. 2) stacked on the above-mentioned plate surface, whereby the cooling flow passages 56 are formed. In the first flow passage structure 32, the absorption flow passage substrates 44 and the cooling substrates 45 are alternately stacked, with the sealing plates 46 being interposed therebetween, whereby the plurality of absorption flow passages 50 formed on the absorption flow passage substrates 44 and the plurality of cooling flow passages 56 formed on the cooling substrates 45 are consequently alternately arrayed in the stacking direction of each plate. The absorption flow passages 50 and the cooling flow passages 56 adjacent in the stacking direction are arranged adjacent to each other at a distance therebetween that allows the absorption liquid and the cooling water flowing through the former and the latter, respectively, to exchange heat with each other. Each cooling flow passage 56 has an introduction port 56*a* for receiving the cooling water at an upstream-side end thereof, and an outflow port 56*b* through which the cooling water is allowed to flow out, at a downstream-side end thereof. Each introduction port 56*a* and each outflow port 56*b* open on respective corresponding side surfaces of the first flow passage structure 32.

The gas supply header 34 (see FIG. 2) divides and supplies the off-gas to the first introduction ports 51*a* of the absorption flow passages 50 (see FIG. 3). The gas supply header 34 is mounted on the side surface of the first flow passage structure 32 on which the first introduction ports 51*a* of the absorption flow passages 50 in the flow passage structure 32 are formed, in such a manner that the first introduction ports 51*a* of all of the absorption flow passages 50 should be covered together by the gas supply header 34. The gas supply header 34 is connected to the off-gas tank 9 (see FIG. 1) via a pipe, so that the off-gas retained in the off-gas tank 9 is supplied to the gas supply header 34.

The absorption liquid supply header 36 (see FIG. 2) divides and supplies the absorption liquid to the second introduction ports 52*a* of the absorption flow passages 50 (see FIG. 3). The absorption liquid supply header 36 is mounted on the side surface of the first flow passage structure 32 on which the second introduction ports 52*a* of the absorption flow passages 50 in the first flow passage structure 32 are formed, in such a manner that the second introduction ports 52*a* of all of the absorption flow passages 50 should be covered together by the absorption liquid supply header 36. To the absorption liquid supply header 36, an absorption liquid supply pipe is connected, so that the absorption liquid should be supplied from the supply pipe to the absorption liquid supply header 36.

The separation header 38 (see FIG. 2) separates the $CO_2$-free gas and the absorption liquid after absorption flowing out of the outflow ports 54*a* (see FIG. 3) into gas and liquid. The separation header 38 is mounted on the side surface of the first flow passage structure 32 on which the outflow ports 54*a* of the absorption flow passage 50 in the flow passage structure 32 are formed, in such a manner that the outflow ports 54*a* of all of the absorption flow passages 50 are covered together by the separation header 38. To the internal space of the separation header 38, $CO_2$-free gas and the absorption liquid after absorption are discharged from each outflow port 54*a*, and in the internal space, the $CO_2$-free gas and the absorption liquid after absorption separate into gas and liquid due to a specific gravity difference therebetween. A gas discharge path 39*a* (see FIG. 1) is connected to an upper part of the separation header 38, and an absorption liquid discharge path 39*b* (see FIG. 1) is connected to a lower part of the separation header 38. The $CO_2$-free gas separated in the separation header 38 is discharged through the gas discharge path 39a, and the absorption liquid after absorption, separated in the separation header 38, is discharged through the absorption liquid discharge path 39b. The gas discharge path 39a is continuous to the supply path 15 for supplying the mixed gas to the heating device 4, so as to guide the $CO_2$-free gas to the supply path 15. The absorption liquid discharge path 39b is continuous to the release processing unit 26, so as to guide the absorption liquid after absorption to the release processing unit 26.

The cooling water supply header 40 (see FIG. 2) divides and supplies the cooling water to the introduction ports 56a of the cooling flow passages 56 (see FIG. 5). The cooling water supply header 40 is mounted on the side surface of the first flow passage structure 32 on which the introduction ports 56a of the cooling flow passages 56 in the first flow passage structure 32 are formed, in such a manner that the introduction ports 56a of all of the cooling flow passages 56 are covered together by the cooling water supply header 40. To the cooling water supply header 40, a cooling water supply pipe is connected, so that cooling water should be supplied from the supply pipe to the cooling water supply header 40.

The cooling water discharge header 42 (see FIG. 2) receives cooling water that is used for removing heat in the first flow passage structure 32 and flows out from the outflow ports 56b of the cooling flow passages 56 (see FIG. 5). The cooling water discharge header 42 is mounted on the side surface of the first flow passage structure 32 on which the outflow ports 56b of the cooling flow passages 56 in the first flow passage structure are formed, in such a manner than the outflow ports 56b of all of the cooling flow passages 56 are covered together by the cooling water discharge header 42. To the cooling water discharge header 42, a cooling water discharge pipe is connected, so that used cooling water discharged to the inside of the cooling water discharge header 42 should be discharged through the discharge pipe.

The release processing unit 26 performs release processing for causing $CO_2$ to be released from the absorption liquid after absorption, wherein, while the absorption liquid after absorption is allowed to flow through release flow passages 74 (see FIG. 7), which are microchannels, $CO_2$ is released from the absorption liquid after absorption. As illustrated in FIG. 6, the release processing unit 26 includes a second flow passage structure 58, an absorption liquid introduction header 60, an absorption liquid discharge header 62, a heat medium supply header 64, and a heat medium discharge header 66.

The second flow passage structure 58 includes releasing units 72 and heating units 73. The releasing units 72 includes a multiplicity of release flow passages 74 (see FIG. 7) that, while allowing the absorption liquid after absorption to flow therethrough, allows the absorption liquid after absorption to release $CO_2$ therefrom. The heating unit 73 heats the absorption liquid after absorption using heat of the heat medium supplied from the heat medium supply device 21, so as to cause the absorption liquid after absorption to release $CO_2$, thereby taking out $CO_2$. This heating unit 73 includes a multiplicity of heat medium flow passages 76 (see FIG. 8) through which the heat medium supplied from the heat medium supply device 21 is flown so as to allow the heat medium to exchange heat with the absorption liquid after absorption flowing through the release flow passages 74. A specific structure of the second flow passage structure 58 is described below.

The second flow passage structure 58 is made of a stacked body formed with a multiplicity of plates made of, for example, stainless steel that are stacked and bonded on one another, as illustrated in FIG. 6. In the multiplicity of plates composing the second flow passage structure 58, a plurality of release flow passage substrates 68 and a plurality of heat medium substrates 70 are included. In the second flow passage structure 58, the release flow passage substrates 68 and the heat medium substrates 70 are alternately and repeatedly stacked.

The releasing unit 72 is formed with the plurality of release flow passage substrates 68. On each of the release flow passage substrate 68, a plurality of release flow passages 74 (see FIG. 7) are provided. More specifically, as illustrated in FIG. 7, on one of plate surfaces of each of the release flow passage substrates 68, the plurality of release flow passages 74 are formed in parallel with one another. Each of the release flow passages 74 is a microchannel having a very small flow passage diameter of several micrometers to several millimeters, and has a meandering shape.

On one of plate surfaces of each of the release flow passage substrates 68, a plurality of fine grooves are formed, which are in shapes respectively corresponding to the release flow passages 74. Openings of these grooves on the above-mentioned plate surface are sealed by the heat medium substrate 70 stacked on the above-mentioned plate surface, whereby the release flow passages 74 are formed. Each release flow passage 74 has an introduction port 74a for receiving the absorption liquid after absorption at an upstream-side end thereof, and an outflow port 74b through which the absorption liquid after release, which is absorption liquid that has flown through the release flow passage 74 and has released $CO_2$ is allowed to flow out, at a downstream-side end thereof. Each introduction port 74a and each outflow port 74b open on respective corresponding side surfaces of the second flow passage structure 58.

The heating unit 73 (see FIG. 6) is formed with the plurality of heat medium substrates 70. On each of the heat medium substrates 70, a plurality of heat medium flow passages 76 (see FIG. 8) are provided. More specifically, as illustrated in FIG. 8, on one of plate surfaces of each of the heat medium substrates 70, the plurality of heat medium flow passages 76 are formed in parallel with one another. Each of the heat medium flow passages 76 is a microchannel having a very small flow passage diameter of several micrometers to several millimeters, and has a meandering shape as illustrated in FIG. 8.

On one of plate surfaces of each of the each heat medium substrates 70, a plurality of fine grooves are formed, which are in shapes respectively corresponding to the heat medium flow passages 76. Openings of these grooves on the above-mentioned plate surface are sealed by the release flow passage substrate 68 staked on the above-mentioned plate surface, whereby the heat medium flow passages 76 are formed. The release flow passage substrates 68 and the heat medium substrates 70 are alternately stacked, whereby the plurality of release flow passages 74 formed on the release flow passage substrates 68, and the plurality of heat medium flow passages 76 formed on the heat medium substrates 70 are consequently alternately arrayed in the stacking direction of each substrate. The release flow passages 74 and the heat medium flow passages 76 adjacent in the stacking direction are arranged adjacent to each other at a distance therebetween that allows the absorption liquid after absorption and the heat medium flowing the former and the latter, respectively, to exchange heat with each other. Each heat medium flow passage 76 has an introduction port 76a for receiving the heat medium at an upstream-side end thereof, and an outflow port 76b through which the heat medium having flown through the heat medium flow passage 76 is allowed to flow out, at a downstream-side end thereof. Each introduction port 76a and each outflow port 76b open on respective corresponding side surfaces of the second flow passage structure 58.

The absorption liquid introduction header 60 (see FIG. 6) divides and introduces the absorption liquid after absorption to the introduction ports 74a of the release flow passages 74 (see FIG. 7). The absorption liquid introduction header 60 is mounted on the side surface of the second flow passage structure 58 on which the introduction ports 74a of the release flow passages 74 in the second flow passage structure 58 are formed, in such a manner that the introduction ports 74a of all of the release flow passages 74 are covered together by the absorption liquid introduction header 60. To the absorption liquid introduction header 60, the absorption liquid discharge path 39b (see FIG. 1) is connected, so that the absorption liquid after absorption is supplied from the absorption liquid discharge path 39b to the absorption liquid introduction header 60.

The absorption liquid discharge header 62 (see FIG. 6) receives absorption liquid after release that flows out of the outflow ports 74b of the release flow passages 74 (see FIG. 7), and $CO_2$ released from the release flow passages 74. The absorption liquid discharge header 62 is mounted on the side surface of the second flow passage structure 58 on which the outflow ports 74b of the release flow passages 74 in the second flow passage structure 58 are formed, in such a manner that the outflow ports 74b of all of the release flow passage 74 are covered together by the absorption liquid discharge header 62. The absorption liquid discharge header 62 allows gas-liquid separation to occur to the absorption liquid after release and $CO_2$ that are discharged into the internal space thereof. This is similar to that of the separation header 38. The $CO_2$ discharge path 63a (see FIG. 1) is connected to an upper part of the absorption liquid discharge header 62, and the absorption liquid discharge path 63b is connected to a lower part of the absorption liquid discharge header 62. The $CO_2$ separated in the absorption liquid discharge header 62 is discharged through the $CO_2$ discharge path 63a, and the absorption liquid after release separated in the absorption liquid discharge header 62 is discharged through the absorption liquid discharge path 63b.

The heat medium supply header 64 (see FIG. 6) divides and introduces the heat medium to the introduction ports 76a of the heat medium flow passages 76 (see FIG. 8). The heat medium supply header 64 is mounted on the side surface of the second flow passage structure 58 on which the introduction ports 76a of the heat medium flow passages 76 in the second flow passage structure 58 are formed, in such a manner that the introduction ports 76a of all of the heat medium flow passages 76 are covered together by the heat medium supply header 64. To the heat medium supply header 64, the heat medium supply pipe 27 continuous to the heat medium tank 20 is connected, so that the heat medium is supplied through the heat medium supply pipe 27 from the heat medium tank 20 to the heat medium supply header 64.

The heat medium discharge header 66 (see FIG. 6) receives the used heat medium that flows out of the outflow ports 76b of the heat medium flow passages 76 (see FIG. 8). The heat medium discharge header 66 is mounted on the side surface of the second flow passage structure 58 on which the outflow ports 76b of the heat medium flow passages 76 in the second flow passage structure 58 are formed, in such a manner that the outflow ports 76b of all of the heat medium flow passages 76 are covered together by the heat medium discharge header 66. To the heat medium discharge header 66, the discharge pipe 67 (see FIG. 1) is connected. The used heat medium discharged into the heat medium discharge header 66 is discharged out through the discharge pipe 67. Though the illustration is omitted, the discharge pipe 67 is continuous to the heat medium tank 20. The used heat medium, therefore, is introduced via the discharge pipe 67 to the heat medium tank 20.

Next, the following description describes a hydrogen production method using the hydrogen production apparatus 1 according to the present embodiment.

First of all, water vapor and fossil fuel such as CNG are supplied to the reformer 3 (see FIG. 1). Further, fuel and oxygen are supplied to the heating device 4. The heating device 4 generates heat by burning the fuel, and heats the reformer 3. In the reformer 3, a reforming reaction in which $CH_4$ in the fossil fuel reacts with water vapor whereby CO and hydrogen are generated proceeds as heat is supplied from the heating device 4. This reforming reaction is performed at about 800° C. due to heat from the heating device 4.

The heating device 4 discharges exhaust gas generated by the burning of fuel to the exhaust path 16, and the exhaust gas thus discharged to the exhaust path 16 is introduced from the exhaust gas introduction ports 10a to the exhaust gas heat exchanger 10. In the exhaust gas heat exchanger 10, heat exchange is carried out between gas that contains fuel and oxygen to be supplied to the heating device 4 and exhaust gas introduced to the exhaust gas heat exchanger 10. The exhaust gas discharged from the heating device 4 has a temperature of 1000° C. or higher, and in the exhaust gas heat exchanger 10, the gas containing fuel and oxygen exchanges heat with the exhaust gas, whereby the temperature thereof rises. This improves the efficiency of the fuel burning in the heating device 4.

The exhaust gas after the heat exchange in the exhaust gas heat exchanger 10 is discharged from the exhaust gas discharge ports 10b, and thereafter, introduced into the third heat exchanger 18. The exhaust gas discharged from the exhaust gas discharge ports 10b has a temperature of about 150° C. to about 300° C. To the third heat exchanger 18, water is supplied as a heat medium. In the third heat exchanger 18, heat exchange is performed between the exhaust gas and the water as a heat medium introduced thereto. This causes the temperature of the water as a heat medium to rise, and the heat medium is discharged through the discharge ports 18d. This discharged heat medium is introduced through the heat medium collection path 19 into the heat medium tank 20. With this, a part of the waste heat from the heating device 4, that is, a part of heat of the exhaust gas, is collected.

CO and hydrogen generated in the reformer 3 by the reforming reaction are also discharged from the discharge part 3a of the reformer 3. Here, $CH_4$ and water vapor that did not react in the reformer 3 are also discharged from the discharge part 3a. In other words, reformed gas containing CO, hydrogen, $CH_4$ and water vapor is discharged from the discharge part 3a. This reformed gas thus discharged has a temperature of about 800° C. The discharged reformed gas is introduced via the introduction ports 13a to the first heat exchanger 13, and exchanges heat with the heat medium in the first heat exchanger 13, thereby being cooled to about 250° C. Here, to the first heat exchanger 13, water is supplied as the heat medium. The temperature of the water as the heat medium rises due to heat exchange with the reformed gas, whereby the water becomes boiling water. The water is then discharged via the heat medium discharge ports 13d, and is introduced through the heat medium collection path 19, to the heat medium tank 20. Through this process, the heat of the reformed gas is collected.

The reformed gas after the heat exchange in the first heat exchanger 13 is discharged via the discharge ports 13b, and is introduced to the transformer 6. In the transformer 6, CO in the reformed gas introduced thereto and water vapor react, thereby causing a transformation reaction, in which $CO_2$ and hydrogen are generated. Then, the transformed gas containing $CO_2$ and hydrogen generated in the transformation reaction, CO and water vapor that did not react, and a very small amount of $CH_4$ is discharged from the discharge part 6b of the transformer 6. The reaction temperature of the transformation reaction is about 250° C., and the temperature of the transformed gas discharged from the discharge part 6b is also about 250° C.

The transformed gas discharged from the discharge part 6b is introduced via the introduction ports 14a into the second heat exchanger 14, and in the second heat exchanger 14, the transformed gas is subjected to heat exchange with the heat medium, thereby being cooled to about 40° C. Here, to the second heat exchanger 14, water is supplied as the heat medium. The temperature of the water as the heat medium rises due to heat exchange with the transformed gas, whereby the water becomes boiling water. The water is then discharged via the heat medium discharge ports 14d, and is introduced through the heat medium collection path 19, to the heat medium tank 20. Through this process, the heat of the transformed gas is collected.

The transformed gas after the heat exchange in the second heat exchanger 14 is discharged via the discharge ports 14b, and is introduced into the hydrogen separation device 8. The hydrogen separation device 8 separates high-purity hydrogen from the introduced transformed gas by the PSA method. The hydrogen separation in the hydrogen separation device 8 is performed at a temperature of about 40° C. Then, high-purity hydrogen thus separated is discharged from the hydrogen discharge part 8b of the hydrogen separation device 8. Thus, high-purity hydrogen is produced through the process as described above, by the hydrogen production method of the present embodiment.

On the other hand, from the off-gas discharge part 8c of the hydrogen separation device 8, off-gas from which hydrogen was separated is discharged. The off-gas thus discharged contains CO, $CO_2$, hydrogen that was not separated, and a very small amount of $CH_4$. The discharged off-gas is introduced into the off-gas tank 9, and is retained therein.

Thereafter, the off-gas retained in the off-gas tank 9 is introduced into the $CO_2$ separation device 22, and then, $CO_2$ in the off-gas is separated and taken out in the $CO_2$ separation device 22. More specifically, the off-gas is introduced into the gas supply header 34 (see FIG. 2) of the absorption processing unit 24 of the $CO_2$ separation device 22. The off-gas introduced into the gas supply header 34 is divided and introduced to the first supply flow passage part 51 of each absorption flow passage 50 (see FIG. 3). Further, the absorption liquid is supplied to the absorption liquid supply header 36 (see FIG. 2) of the absorption processing unit 24, and from the absorption liquid supply header 36, the absorption liquid, divided, is introduced into the second supply flow passage part 52 (see FIG. 3) of each absorption flow passage 50. This absorption liquid is an absorption liquid that selectively chemically absorbs only $CO_2$ in the off-gas. Further, cooling water is supplied to the cooling water supply header 40 (see FIG. 2) of the absorption processing unit 24, and from the cooling water supply header 40, the cooling water, divided, is introduced to the cooling flow passages 56 (see FIG. 5).

The off-gas introduced to the first supply flow passage part 51 and the absorption liquid introduced to the second supply flow passage part 52 join at the confluence portions 53 (see FIG. 3), and an absorption reaction is performed wherein, while the off-gas and the absorption liquid are flowing through processing flow passage part 54 in a state of being in contact with each other, $CO_2$ in the off-gas is absorbed into the absorption liquid. This absorption reaction is an exothermic reaction, and heat generated in the absorption reaction is removed by heat exchange between the cooling water flowing through the cooling flow passages 56 and the off-gas as well as the absorption liquid flowing through the processing flow passage part 54. By this absorption reaction, $CO_2$ is removed from the off-gas.

Then, the $CO_2$-free gas, which is off-gas after removal of $CO_2$, and the absorption liquid after absorption, flow out of the outflow ports 54a of the absorption flow passages 50 into the internal space of the separation header 38. The $CO_2$-free gas and the absorption liquid after absorption, flowing into the internal space of the separation header 38 (see FIG. 2), separate into gas and liquid due to a specific gravity difference therebetween. The $CO_2$-free gas, thus having separated, is discharged from the separation header 38 to the gas discharge path 39a (see FIG. 1), and the absorption liquid after absorption, thus having separated, is discharged from the separation header 38 to the absorption liquid discharge path 39b (see FIG. 1).

The $CO_2$-free gas is composed of $CH_4$, hydrogen, and CO, and flows through the gas discharge path 39a to the supply path 15 of the heating device 4. This $CO_2$-free gas joins gas containing fuel and oxygen, whereby mixed gas containing the $CO_2$-free gas and the gas containing fuel and oxygen is obtained. The mixed gas is heated to a higher temperature by heat exchange with the exhaust gas in the exhaust gas heat exchanger 10, and thereafter, is supplied to the heating device 4. The heating device 4 causes the supplied mixed gas to burn, thereby generating heat. In other words, the $CO_2$-free gas is used as a part of fuel for the heating device 4.

The absorption liquid after absorption discharged to the absorption liquid discharge path 39b is introduced to the absorption liquid introduction header 60 (see FIG. 6) of the release processing unit 26 from the absorption liquid discharge path 39b. The absorption liquid after absorption introduced to the absorption liquid introduction header 60 is divided and introduced to the release flow passages 74 (see FIG. 7).

Further, the pump 28 (see FIG. 1) sucks the heat medium from the heat medium tank 20 via the heat medium supply pipe 27 and sends the heat medium to the heat medium supply header 64 (see FIG. 6) of the release processing unit 26. Here, the flow amount of the heat medium supplied to the heat medium supply header 64 is the flow amount set by the flow amount control valve 29 (see FIG. 1). As the heat medium at about 80° C. is retained in the heat medium tank 20, the heat medium supplied to the heat medium supply header 64 has a temperature of about 80° C. The heat medium supplied to the heat medium supply header 64 is divided and introduced to the heat medium flow passages 76 (see FIG. 8).

The absorption liquid after absorption introduced into each release flow passage 74 (see FIG. 7), while flowing through the release flow passage 74, is heated by heat exchange with the heat medium flowing through the heat medium flow passage 76 (see FIG. 8), to a temperature higher than the temperature upon the $CO_2$ absorption, thereby releasing $CO_2$. Then, the absorption liquid after release, which has released $CO_2$, and $CO_2$ thus released, flow from the outflow port 74b of each release flow passage 74 to the internal space of the absorption liquid discharge header 62 (see FIG. 6). The absorption liquid after release and the $CO_2$, flowing into the internal space of the absorption liquid discharge header 62, separate into gas and liquid due to a specific gravity difference therebetween. Then, the $CO_2$ thus having separated, is discharged from the absorption liquid discharge header 62 to the $CO_2$ discharge path 63a (see FIG. 1), and at the same time, the absorption liquid after release, thus having separated, is discharged from the absorption liquid discharge header 62 to the absorption liquid discharge path 63b (see FIG. 1). The $CO_2$ thus discharged to the $CO_2$ discharge path 63a is collected.

Through the above-described process, the hydrogen production method involving the separation and collection of $CO_2$ from the off-gas according to the present embodiment is performed.

In the present embodiment, the heat collecting device 11 collects the heat of the reformed gas, the heat of the transformed gas, a part of the waste heat from the heating device 4 heating the reformer 3, by causing the heat medium to absorb the heat, and the heat medium supply device 21 supplies the heat medium having absorbed the heat to the heating unit 73 of the release processing unit 26 of the $CO_2$ separation device 22. In the absorption processing unit 24 of the $CO_2$ separation device 22, $CO_2$ in the off-gas after hydrogen separation is absorbed by the absorption liquid, and in the release processing unit 26, the heating unit 73 heats the absorption liquid after absorption, by utilizing the heat of the heat medium supplied from the heat medium supply device 21, in order to take out $CO_2$ by causing the absorption liquid after absorption, having absorbed $CO_2$, to release $CO_2$. With this configuration, utilizing at least one among the heat of the reformed gas, the heat of the transformed gas, and the waste heat from the heating device 4, the absorption liquid after absorption can be caused to release $CO_2$. This makes it possible to save energy to be additionally applied for causing the absorption liquid after absorption to release $CO_2$ so as to take out $CO_2$. In the present embodiment, therefore, energy applied for separation and collection of $CO_2$, which is involved in the hydrogen production, can be reduced.

Further, in the present embodiment, the $CO_2$ separation device 22 separates $CO_2$ from the off-gas obtained through the reforming reaction by the reformer 3, the transformation reaction by the transformer 6, and the high-purity hydrogen separation by the hydrogen separation device 8. This makes it possible to simplify the process for controlling the temperature of gas generated in the hydrogen production process. In other words, for example, in the case where $CO_2$ is removed from the transformed gas by the $CO_2$ remover in the reformed gas supply path from the reformer to the transformer, as is the case with the prior art, the temperature suitable for the removal of $CO_2$ is very low as compared with both of the reaction temperatures of the reforming reaction and the reforming reaction. It is therefore necessary to cause the temperature of the reformed gas to fall once, then remove $CO_2$, and thereafter, raise the temperature before the reformed gas is supplied to the transformer. This makes the gas temperature controlling process complicated. In contrast, in the present embodiment, the $CO_2$ separation device 22 removes $CO_2$ from off-gas that has gone through the reforming reaction and the transformation reaction, and further, separation of hydrogen. This makes a complicated temperature controlling process as described above unnecessary.

Further, in the present embodiment, among waste heat from heating device 4 that heats the reformer 3, particularly the waste heat remaining after the other waste heat was utilized by the exhaust gas heat exchanger 10 for raising the temperature of the mixed gas is caused to be absorbed in the heat medium in the third heat exchanger 18, and the heat medium having absorbed heat is supplied to the heating unit 73 of the release processing unit 26, and is used for heating the absorption liquid after absorption. Waste heat remaining after the other waste heat was utilized by the exhaust gas heat exchanger 10 for raising the temperature of the mixed gas is low-quality waste heat having a temperature of about 150° C. to about 300° C. Such low-quality waste heat is commonly disposed of, but in the present embodiment, this waste heat is effectively utilized, whereby energy costs can be reduced.

Further, in the present embodiment, the heat medium having absorbed heat in the first to third heat exchangers 13, 14, and 18 is stored in the heat medium tank 20, and the heat medium supply device 21 supplies the heat medium from the heat medium tank 20 to the heating unit 73. Therefore, even in the case where, for example, the amount of hydrogen demand on the hydrogen demand side sharply increases and the amount of hydrogen production by the hydrogen production apparatus 1 sharply increases in order to respond to the demand, which results in that throughput per unit time in the $CO_2$ separation device 22 for causing the absorption liquid after absorption to release $CO_2$ sharply increases, leading to a sharp increase in the amount of heat needed for heating the absorption liquid after absorption in the heating unit 73, it is possible to cope with the increase in the amount of needed heat, with the heat medium stored in the heat medium tank 20. In other words, the heat medium supply device 21 is caused to increase the flow amount of the heat medium supplied from the heat medium tank 20 to the heating unit 73 in accordance with the increase in the amount of the needed heat, whereby the increase in the amount of needed heat in the heating unit 73 can be coped with.

Further, in the present embodiment, as heat is supplied to the heating unit 73 by supplying the heat medium having absorbed heat in the first to third heat exchangers 13, 14, and 18 to the heating unit 73, the amount of heat lost in the process of heat supply to the heating unit 73 can be reduced, as compared with, for example, the case where heat is supplied to a heating unit by heat conduction. In other words, in the case where heat is supplied via a heat transfer member by heat conduction to a heating unit, relatively much heat is lost from the heat transfer member in the process of heat conduction, whereas the amount of lost heat can be controlled by supplying the heat medium itself having absorbed heat to the heating unit 73, as is the case of the present embodiment.

Further, in the present embodiment, in the release processing unit 26, the amount of heat exchange per unit flow amount between the absorption liquid after absorption and the heat medium can be increased by heat exchange between the absorption liquid after absorption flowing through the release flow passages 74, which are microchannels, and the heat medium flowing through the heat medium flow passages 76, which are microchannels. This makes it possible to increase the amount of heat per unit flow amount imparted from the heat medium to the absorption liquid after absorption. Consequently, in the release flow passage 74, the amount of $CO_2$ per unit flow amount released by the absorption liquid after absorption can be increased, whereby the efficiency of release of $CO_2$ from the absorption liquid after absorption can be improved.

Further, in the present embodiment, the heating device 4 is a burner that causes the $CO_2$-free gas to burn as a part of fuel, the $CO_2$-free gas being obtained as a result of removal of $CO_2$ by the $CO_2$ separation device 22, so as to generate heat for heating the reformer 3. Fuel consumed for heating the reformer 3, therefore, can be saved.

It should be noted that the embodiment disclosed herein should be considered exemplary and not limiting in all respects. The scope of the present invention are defined by the scope of claims rather than by the above description of the embodiment, and is intended to include meanings equivalent to the claims and all changes without departing from the claims.

For example, the $CO_2$ separation device 22 is not necessarily limited to the configuration of the embodiment described above, and the configuration may be such that $CO_2$ is separated and collected from off-gas by a known TSA (thermal swing absorption) method. More specifically, the $CO_2$ separation device may be provided with an adsorbent that can adsorb $CO_2$, and a heating unit for heating the adsorbent having adsorbed $CO_2$. In this $CO_2$ separation device, off-gas is brought into contact with the adsorbent, thereby causing $CO_2$ in the off-gas to be adsorbed to the adsorbent, and thereafter, a heating unit heats the adsorbent having adsorbed $CO_2$ to a temperature higher than the temperature upon adsorption of $CO_2$, utilizing heat supplied from the heat supply device, thereby causing the adsorbent to release $CO_2$ and collect the same. The adsorbent in this modification example is an exemplary capturing agent according to the present invention, and the adsorption of $CO_2$ in the off-gas by this adsorbent is an exemplary capturing of $CO_2$ in off-gas by a capturing agent according to the present invention. Further, the adsorbent having adsorbed $CO_2$ is an exemplary capturing agent after capture according to the present invention.

Further, the absorption processing unit is not necessarily limited to the unit that causes $CO_2$ from off-gas to be adsorbed by absorption liquid, while causing the off-gas and the absorption liquid to flow through absorption flow passages formed with microchannels. For example, a release column that causes absorption liquid to absorb $CO_2$ in off-gas while causing the absorption liquid to fall from above may be used as a release processing unit.

Further, the releasing unit of the release processing unit is not necessarily limited to the unit that causes absorption liquid after absorption to release $CO_2$ while causing the absorption liquid after absorption to flow through release flow passages formed with microchannels. Further, the heating unit of the release processing unit is not necessarily limited to the unit that causes heat medium to exchange heat with absorption liquid after absorption flowing through release flow passages while causing the heat medium to flow through heat medium flow passages formed with microchannels, so as to heat the absorption liquid after absorption.

Further, the heat collecting device according to the present invention is not necessarily limited to the heat collecting device 11 in the above-described embodiment. For example, the heat collecting device may collect at least one type of heat by heat conduction, among heat of reformed gas, heat of transformed gas, and waste heat from a heating device, and stores the collected heat in a heat storage body. In this case, the heat supply device according to the present invention may be a heat transfer member that supplies heat stored in the heat storage body to a heating unit of a release processing unit by heat conduction, rather than supplying a heat medium to the heating unit 73 of the release processing unit 26, as in the heat medium supply device 21 of the above-described embodiment. Then, the flow passage structure of the release processing unit may include a heating unit made of a heat preserving material that is arranged so as to preserve heat transferred by a heat transfer member and at the same time is capable of exchanging heat with the absorption liquid after absorption flowing through release flow passages, in place of the heating unit provided with heat medium flow passages. Even with such a configuration, it is possible to heat the absorption liquid after absorption by utilizing at least one among the heat of the reformed gas, the heat of the transformed gas, and the waste heat from the heating device, thereby causing the absorption liquid after absorption to release $CO_2$.

Further, not all of the heat of the reformed gas, the heat of the transformed gas, and the waste heat from the heating device are necessarily utilized in order to cause the absorption liquid after absorption to release $CO_2$. For example, only one or two types of heat among the heat of the reformed gas, the heat of the transformed gas, and the waste heat from the heating device may be utilized for heating the absorption liquid after absorption so as to cause the absorption liquid after absorption to release $CO_2$.

Further, the heat medium that the heat absorption processing unit uses for absorbing heat may be liquid other than water.

What is claimed is:

1. A hydrogen production apparatus comprising:
   a reformer configured to cause a reforming reaction to occur between hydrocarbon and water vapor so as to generate CO and hydrogen;
   a heating device configured to heat the reformer so as to cause the reforming reaction to proceed;
   a transformer configured to cause a transformation reaction of CO in reformed gas generated by the reformer that contains CO and hydrogen, with water vapor, so as to generate hydrogen and $CO_2$;
   a hydrogen separation device configured to separate and take out out hydrogen from transformed gas generated by the transformation reaction that contains hydrogen and $CO_2$;
   a $CO_2$ separation device configured to separate and take out $CO_2$ from off-gas that is gas remaining after hydrogen is separated from the transformed gas by the hydrogen separation device;
   a heat collecting device configured to collect at least one among heat of the reformed gas, heat of the transformed gas, and waste heat from the heating device; and
   a heat supply device configured to supply heat collected by the heat collecting device to the $CO_2$ separation device,
   wherein the reformer, the transformer, the hydrogen separation device and the $CO_2$ separation device are connected in series in a downstream direction;
   the heat collecting device is provided at least at one of locations between the reformer and the transformer and between the transformer and the hydrogen separation device;
   the heat supply device is provided between the heat collecting device and the CO2 separation device; and
   wherein the $CO_2$ separation device includes:

a capturing unit configured to capture $CO_2$ in the off-gas with use of a capturing agent that absorbs or adsorbs $CO_2$; and a heating unit configured to heat a capturing agent after capture that is the capturing agent after capturing $CO_2$, by utilizing heat supplied from the heat supply device, in order to cause the capturing agent after capture to release $CO_2$, thereby taking out $CO_2$ therefrom.

2. The hydrogen production apparatus according to claim 1, wherein the heat collecting device includes a waste heat collection unit that collects waste heat from the heating device.

3. The hydrogen production apparatus according to claim 2, wherein, the heat collecting device includes a heat absorption processing unit that causes heat medium to absorb at least one among the heat of the reformed gas, the heat of the transformed gas, and the waste heat from the heating device, the heat supply device includes a heat medium supply device that supplies the heat medium having absorbed heat to the heating unit, and the heating unit heats the capturing agent after capture by imparting, to the capturing agent after capture, heat of the heat medium supplied from the heat medium supply device.

4. The hydrogen production apparatus according to claim 3, the capturing agent is absorption liquid that is capable of absorbing $CO_2$ from the off-gas, the capturing unit is an absorption processing unit that causes the absorption liquid to absorb $CO_2$ in the off-gas, the $CO_2$ separation device includes a releasing unit provided with a release flow passage that, while allowing absorption liquid after absorption that is the absorption liquid having absorbed $CO_2$ in the absorption processing unit to flow therethrough, causes the absorption liquid after absorption to release $CO_2$, the heating unit includes a heat medium flow passage that allows the heat medium supplied from the heat medium supply device to flow therethrough in such a manner that the heat medium exchanges heat with the absorption liquid after absorption flowing through the release flow passage, and both of the release flow passage and the heat medium flow passage are microchannels.

5. The hydrogen production apparatus according to claim 1, wherein the heat collecting device includes a heat storage unit that stores collected heat, and the heat supply device supplies the heat stored in the heat storage unit to the heating unit.

6. The hydrogen production apparatus according to claim 5, wherein, the heat collecting device includes a heat absorption processing unit that causes heat medium to absorb at least one among the heat of the reformed gas, the heat of the transformed gas, and the waste heat from the heating device, the heat supply device includes a heat medium supply device that supplies the heat medium having absorbed heat to the heating unit, and the heating unit heats the capturing agent after capture by imparting, to the capturing agent after capture, heat of the heat medium supplied from the heat medium supply device.

7. The hydrogen production apparatus according to claim 6, the capturing agent is absorption liquid that is capable of absorbing $CO_2$ from the off-gas, the capturing unit is an absorption processing unit that causes the absorption liquid to absorb $CO_2$ in the off-gas, the $CO_2$ separation device includes a releasing unit provided with a release flow passage that, while allowing absorption liquid after absorption that is the absorption liquid having absorbed $CO_2$ in the absorption processing unit to flow therethrough, causes the absorption liquid after absorption to release $CO_2$, the heating unit includes a heat medium flow passage that allows the heat medium supplied from the heat medium supply device to flow therethrough in such a manner that the heat medium exchanges heat with the absorption liquid after absorption flowing through the release flow passage, and both of the release flow passage and the heat medium flow passage are microchannels.

8. The hydrogen production apparatus according to claim 1, wherein, the heat collecting device includes a heat absorption processing unit that causes heat medium to absorb at least one among the heat of the reformed gas, the heat of the transformed gas, and the waste heat from the heating device, the heat supply device includes a heat medium supply device that supplies the heat medium having absorbed heat to the heating unit, and the heating unit heats the capturing agent after capture by imparting, to the capturing agent after capture, heat of the heat medium supplied from the heat medium supply device.

9. The hydrogen production apparatus according to claim 8, the capturing agent is absorption liquid that is capable of absorbing $CO_2$ from the off-gas, the capturing unit is an absorption processing unit that causes the absorption liquid to absorb $CO_2$ in the off-gas, the $CO_2$ separation device includes a releasing unit provided with a release flow passage that, while allowing absorption liquid after absorption that is the absorption liquid having absorbed $CO_2$ in the absorption processing unit to flow therethrough, causes the absorption liquid after absorption to release $CO_2$, the heating unit includes a heat medium flow passage that allows the heat medium supplied from the heat medium supply device to flow therethrough in such a manner that the heat medium exchanges heat with the absorption liquid after absorption flowing through the release flow passage, and both of the release flow passage and the heat medium flow passage are microchannels.

10. The hydrogen production apparatus according to claim 1, wherein the heating device includes a burner that burns off-gas from which $CO_2$ is removed by the capturing agent capturing $CO_2$, so as to generate heat for heating the reformer.

* * * * *